(12) United States Patent
Washio

(10) Patent No.: US 10,591,056 B2
(45) Date of Patent: Mar. 17, 2020

(54) CONTROL APPARATUS FOR VEHICLE DRIVE-FORCE TRANSMITTING APPARATUS

(71) Applicant: TOYOTA JIDOSHA KABUSHIKI KAISHA, Toyota-shi, Aichi (JP)

(72) Inventor: Taichi Washio, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/170,171

(22) Filed: Oct. 25, 2018

(65) Prior Publication Data
US 2019/0128415 A1 May 2, 2019

(30) Foreign Application Priority Data

Oct. 31, 2017 (JP) ................................. 2017-211278

(51) Int. Cl.
*B60W 10/107* (2012.01)
*F16H 61/70* (2006.01)
(Continued)

(52) U.S. Cl.
CPC ..... *F16H 61/702* (2013.01); *F16H 61/66272* (2013.01); *B60W 10/107* (2013.01);
(Continued)

(58) Field of Classification Search
CPC .......... Y10T 477/624; Y10T 477/6242; B60W 10/107; B60W 2710/1083;
(Continued)

(56) References Cited

U.S. PATENT DOCUMENTS

2011/0053718 A1 3/2011 Nonomura et al.
2015/0080156 A1* 3/2015 Takahashi ......... F16H 61/66259
474/11
(Continued)

FOREIGN PATENT DOCUMENTS

JP 2010159854 A * 7/2010 ....... F16H 61/66272
JP 2011-047459 A 3/2011
(Continued)

*Primary Examiner* — Roger L Pang
(74) *Attorney, Agent, or Firm* — Oliff PLC

(57) ABSTRACT

A control apparatus for a vehicle drive-force transmitting apparatus that includes a gear mechanism and a continuously-variable transmission mechanism including a primary pulley, a secondary pulley, a transfer element that is looped over the primary and secondary pulleys, and an actuator configured to apply, to the primary pulley, a thrust, based on which the transfer element is to be clamped by the primary pulley. The vehicle drive-force transmitting apparatus defines a first drive-force transmitting path for transmitting a drive force through the gear mechanism and a second drive-force transmitting path for transmitting the drive force through the continuously-variable transmission mechanism. The control apparatus is configured, upon vehicle deceleration with the first drive-force transmitting path being established, to set a lower limit value of the above-described thrust, based on a gear ratio of the continuously-variable transmission mechanism and an amount of change of a rotational speed of the primary pulley.

8 Claims, 5 Drawing Sheets

(51) Int. Cl.
*F16H 61/662* (2006.01)
*F16H 37/08* (2006.01)
*F16H 59/70* (2006.01)
*F16H 59/14* (2006.01)
*F16H 59/48* (2006.01)
*F16H 37/02* (2006.01)

(52) U.S. Cl.
CPC ............... *B60W 2510/1005* (2013.01); *B60W 2510/1025* (2013.01); *B60W 2710/1083* (2013.01); *F16H 37/022* (2013.01); *F16H 37/0846* (2013.01); *F16H 59/14* (2013.01); *F16H 59/48* (2013.01); *F16H 59/70* (2013.01); *F16H 2037/0866* (2013.01); *F16H 2059/147* (2013.01); *F16H 2059/704* (2013.01); *F16H 2061/66277* (2013.01); *Y10T 477/624* (2015.01); *Y10T 477/6242* (2015.01)

(58) Field of Classification Search
CPC ... B60W 2510/1005; B60W 2510/1025; F16H 61/66272; F16H 37/022; F16H 2061/66277; F16H 2059/147; F16H 2059/704; F16H 59/48; F16H 59/14; F16H 59/70; F16H 2037/0866; F16H 37/0846
USPC ......................................................... 475/210
See application file for complete search history.

(56) References Cited

U.S. PATENT DOCUMENTS

| 2015/0081181 A1* | 3/2015 | Takahashi ......... F16H 61/66272 701/51 |
| 2017/0114895 A1 | 4/2017 | Hattori et al. |
| 2018/0015929 A1* | 1/2018 | Miyaishi ............... F16H 61/662 |
| 2018/0037229 A1* | 2/2018 | Nakano .................. B60W 10/02 |

FOREIGN PATENT DOCUMENTS

| JP | 2015-098892 A | 5/2015 | |
| JP | 2015-227697 A | 12/2015 | |
| WO | WO-2016140027 A1 * | 9/2016 | ............. B60L 50/16 |

* cited by examiner

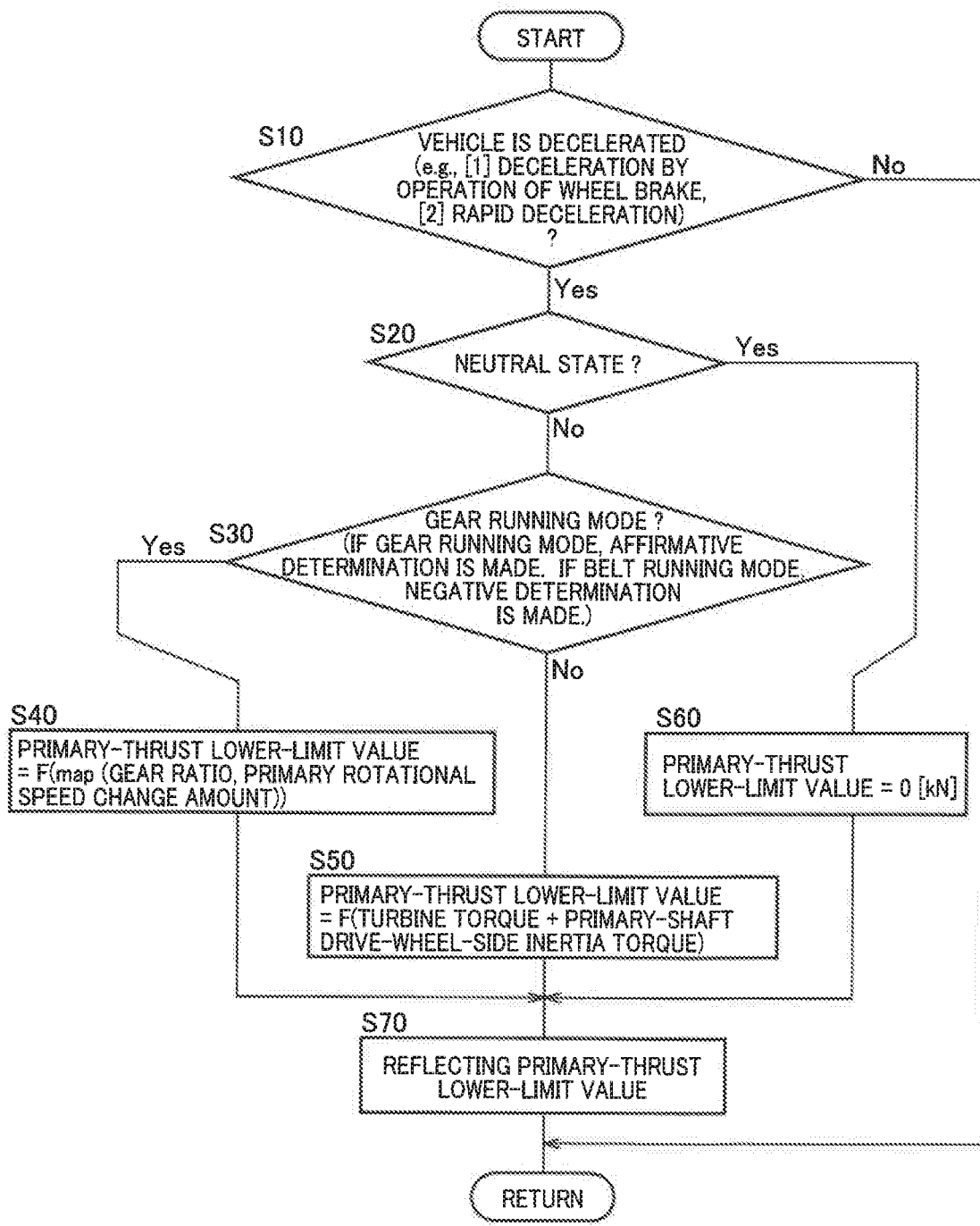

CONTROL APPARATUS FOR VEHICLE DRIVE-FORCE TRANSMITTING APPARATUS

This application claims priority from Japanese Patent Application No. 2017-211278 filed on Oct. 31, 2017, the disclosure of which is herein incorporated by reference in its entirety.

FIELD OF THE INVENTION

The present invention relates to a control apparatus for a drive-force transmitting apparatus that is to be provided in a vehicle, wherein the drive-force transmitting apparatus has a plurality of drive-force transmitting paths that are provided in parallel with each other between a drive force source and drive wheels of the vehicle.

BACKGROUND OF THE INVENTION

There is known a vehicle drive-force transmitting apparatus defining a drive-force transmitting path through which a drive force is to be transmitted by a continuously-variable transmission mechanism including a primary pulley, a secondary pulley, and a transfer element in the form of a belt or a chain that is looped over the primary and secondary pulleys. JP-2015-98892A discloses a vehicle provided with such a vehicle drive-force transmitting apparatus configured to transmit a drive force of an engine toward drive wheels while changing a rotational speed. There is also known a drive-force transmitting apparatus defining two drive-force transmitting paths, wherein one of the two drive-force transmitting paths is a path through which the drive force is to be transmitted by a continuously-variable transmission mechanism while the other of the two drive-force transmitting paths is a path through which the drive force is to be transmitted by a gear mechanism configured to provide at least one gear ratio. A vehicle transmission, which is disclosed in JP-2015-227697A, is an example of such a drive-force transmitting apparatus. The vehicle transmission disclosed in the JP-2015-227697A includes a gear mechanism (configured to provide a gear ratio) and a belt-type continuously-variable transmission mechanism that are provided in parallel with each other between an input rotary member (to which a drive force of a drive force source is to be transmitted) and an output rotary member (configured to output the drive force source to drive wheels), and also first and second engagement devices. The first engagement device is provided in a first drive-force transmitting path through which the drive force is to be transmitted by the gear mechanism, while the second engagement device is provided in a second drive-force transmitting path through which the drive force is to be transmitted by the continuously-variable transmission mechanism.

SUMMARY OF THE INVENTION

By the way, upon deceleration of a vehicle, an inertia torque is generated with reduction of a rotational speed of drive wheels of the vehicle. In the vehicle drive-force transmitting apparatus, as disclosed in the JP-2015-98892A, which defines the single drive-force transmitting path through which the drive force is to be transmitted by the continuously-variable transmission mechanism, when the vehicle is decelerated, the inertia torque accompanying the reduction of the rotational speed of the drive wheels is inputted to the continuously-variable transmission mechanism. For preventing slipping of a belt in the continuously-variable transmission mechanism upon deceleration of the vehicle, it might be possible to determine or set a lower limit value of a thrust applied to a primary pulley to clamp the belt, by taking account of the above-described inertia torque, such that the applied thrust is not smaller than a required thrust required to prevent the belt slippage.

In the vehicle drive-force transmitting apparatus, as disclosed in the JP-2015-227697A, which defines the first drive-force transmitting path (through which the drive force is to be transmitted by the gear mechanism) and the second drive-force transmitting path (through which the drive force is to be transmitted by the continuously-variable transmission mechanism), the vehicle is capable of running with either one of the two drive-force transmitting paths being established. During running of the vehicle with the first drive-force transmitting path, the second drive-force transmitting path is cut off with release of the second engagement device. Therefore, a magnitude of a torque inputted to the continuously-variable transmission mechanism upon deceleration of the vehicle could vary depending on which one of the first and second drive-force transmitting paths is established during running of the vehicle. Thus, the lower limit value of the thrust applied to the primary pulley, which is set appropriately for running of the vehicle with the second drive-force transmitting path being established, could be an inappropriate value as the lower limit value of the thrust applied to the primary pulley during running of the vehicle with the first drive-force transmitting path being established. When the lower limit value of the thrust applied to the primary pulley is not an appropriate value, a belt slippage or a transmission efficiency reduction could take place in the continuously-variable transmission mechanism.

The present invention was made in view of the background art described above. It is therefore an object of the present invention to provide a control apparatus for a vehicle drive-force transmitting apparatus, which is capable of setting a lower limit value of a thrust applied to a primary pulley, which is appropriate for deceleration of the vehicle made during running with a drive-force transmitting path, through which the drive force is to be transmitted by a gear mechanism, being established.

The object indicated above is achieved according to the following aspects of the present invention.

According to a first aspect of the invention, there is provided a control apparatus for a drive-force transmitting apparatus that is to be provided in a vehicle having a drive force source and drive wheels. The drive-force transmitting apparatus includes: (i) an input rotary member to which a drive force is to be transmitted from the drive force source; (ii) an output rotary member from which the drive force is to be outputted to the drive wheels; (iii) a gear mechanism configured to provide at least one gear ratio; (iv) a continuously-variable transmission mechanism including a primary pulley, a secondary pulley, a transfer element that is looped over the primary and secondary pulleys, and a hydraulic actuator configured to apply, to the primary pulley, a thrust, based on which the transfer element is to be clamped by the primary pulley; and (v) first and second engagement devices. The drive-force transmitting apparatus defines a plurality of drive-force transmitting paths that are provided in parallel with each other between the input rotary member and the output rotary member such that the drive force is to be transmitted from the input rotary member to the output rotary member through the drive-force transmitting paths. The plurality of drive-force transmitting paths includes a first drive-force transmitting path that is to be established by engagement of the first engagement device, such that the drive force is to be transmitted by the gear mechanism through the first drive-force transmitting path when the first drive-force transmitting path is established by the engagement of the first engagement device. The plurality of drive-force transmitting paths includes a second drive-force transmitting path that is to be established by engagement of the second engagement device, such that the drive force is to be transmitted by the continuously-variable transmission mechanism through the second drive-force transmitting path when the second drive-force transmitting path is established by the engagement of the second engagement device. The control apparatus includes: a lower-limit-value setting portion configured, when the vehicle is decelerated with the first drive-force transmitting path being established, to set a lower limit value of the thrust that is to be applied to the primary pulley from the hydraulic actuator such that the lower limit value is set based on a gear ratio of the continuously-variable transmission mechanism and an amount of change of a rotational speed of the primary pulley. It is noted that the above-described gear ratio of the continuously-variable transmission mechanism is a ratio of a rotational speed of the primary pulley to a rotational speed of the secondary pulley. It is further noted that the control apparatus may further includes a state determining portion. The state determining portion is configured to determine whether the vehicle is decelerated or not, and to determine whether the drive-force transmitting apparatus is in a neutral state or not. Further, the state determining portion is configured, when determining that the drive-force transmitting apparatus is not in the neutral state, to determine which one of the first and second drive-force transmitting paths is established in the drive-force transmitting apparatus.

According to a second aspect of the invention, in the control apparatus according to the first aspect of the invention, the lower-limit-value setting portion is configured, when the vehicle is decelerated with the first drive-force transmitting path being established, to set the lower limit value of the thrust that is to be applied to the primary pulley, such that the set lower limit value is increased with reduction of the gear ratio of the continuously-variable transmission mechanism, and such that the set lower limit value is increased with increase of the amount of change of the rotational speed of the primary pulley.

According to a third aspect of the invention, in the control apparatus according to the first or second aspect of the invention, the lower-limit-value setting portion, when the vehicle is decelerated with the first drive-force transmitting path being established, to set the lower limit value of the thrust that is to be applied to the primary pulley, such that the set lower limit value is increased with increase of an input torque inputted to the primary pulley. The input torque is calculated by applying the gear ratio of the continuously-variable transmission mechanism and the amount of change of the rotational speed of the primary pulley to a predetermined relationship.

According to a fourth aspect of the invention, in the control apparatus according to the third aspect of the invention, the predetermined relationship is a relationship in which the input torque is increased with reduction of the gear ratio of the continuously-variable transmission mechanism, and is a relationship in which the input torque is increased with increase of the amount of change of the rotational speed of the primary pulley.

According to a fifth aspect of the invention, in the control apparatus according to any one of the first through fourth aspects of the invention, the lower-limit-value setting portion is configured, when the vehicle is decelerated with the second drive-force transmitting path being established, to set the lower limit value of the thrust that is to be applied to the primary pulley such that the lower limit value is set based on a torque of the drive force source and a torque applied from the drive wheels.

According to a sixth aspect of the invention, in the control apparatus according to the fifth aspect of the invention, the lower-limit-value setting portion is configured, when the vehicle is decelerated with the second drive-force transmitting path being established, to set the lower limit value of the thrust that is to be applied to the primary pulley, such that the set lower limit value is increased with increase of the torque of the drive force source, and such that the set lower limit value is increased with increase of the torque applied from the drive wheels.

According to a seventh aspect of the invention, in the control apparatus according to any one of the first through sixth aspects of the invention, the second engagement device is disposed between the secondary pulley and the output rotary member, namely, is disposed in a part of the second drive-force transmitting path, which is between the secondary pulley and the output rotary member. The lower-limit-value setting portion is configured, when the vehicle is decelerated in a neutral state in which both of the first and second engagement devices are released, to not set the lower limit value of the thrust or set the lower limit value to zero.

In the control apparatus according to the first aspect of the invention, where the vehicle runs with the first drive-force transmitting path (through which the drive force is to be transmitted by the gear mechanism) being established when being decelerated, the lower limit value of the thrust applied to the primary pulley is set based on the gear ratio of the continuously-variable transmission mechanism and the amount of change of the rotational speed of the primary pulley, which influence a magnitude of a torque generated in the continuously-variable transmission mechanism, since the second drive-force transmitting path (through which the drive force is to be transmitted by the continuously-variable transmission mechanism) is cut off by release of the second engagement device. Thus, it is possible to set the lower limit value of the thrust applied to the primary pulley, to a value appropriate for the deceleration made during the running with the first drive-force transmitting path being established.

In the control apparatus according to the second aspect of the invention, where the vehicle runs with the first drive-force transmitting path being established when being decelerated, the lower limit value of the thrust applied to the primary pulley is set, such that the set lower limit value is increased with reduction of the gear ratio of the continuously-variable transmission mechanism, and such that the set lower limit value is increased with increase of the amount of change of the rotational speed of the primary pulley. Thus, the lower limit value of the thrust applied to the primary pulley is set to a value appropriate for the deceleration made during the running with the first drive-force transmitting path being established.

In the control apparatus according to the third aspect of the invention, where the vehicle runs with the first drive-force transmitting path being established when being decelerated, the input torque inputted to the primary pulley is calculated by applying the gear ratio of the continuously-variable transmission mechanism and the amount of change of the rotational speed of the primary pulley to the predetermined relationship, and the lower limit value of the thrust applied to the primary pulley is set, such that the set lower limit value is increased with increase of the input torque.

Thus, the lower limit value of the thrust applied to the primary pulley is set to a value appropriate for the deceleration made during the running with the first drive-force transmitting path being established.

In the control apparatus according to the fourth aspect of the invention, the above-described predetermined relationship is a relationship in which the input torque is increased with reduction of the gear ratio of the continuously-variable transmission mechanism, and is a relationship in which the input torque is increased with increase of the amount of change of the rotational speed of the primary pulley. Thus, the lower limit value of the thrust applied to the primary pulley is set to a value appropriate for the deceleration made during the running with the first drive-force transmitting path being established.

In the control apparatus according to the fifth aspect of the invention, where the vehicle runs with the second drive-force transmitting path (through which the drive force is to be transmitted by the continuously-variable transmission mechanism) being established when being decelerated, the lower limit value of the thrust that is to be applied to the primary pulley is set based on the torque of the drive force source and the torque applied from the drive wheels, which influence the magnitude of the torque applied to the continuously-variable transmission mechanism when the second drive-force transmitting path is established. Thus, the lower limit value of the thrust applied to the primary pulley is set to a value appropriate for the deceleration made during the running with the second drive-force transmitting path being established. That is, with combination of feature of each of the above-described first through fourth aspects of the invention, the lower limit value is determined in a manner varies depending on which one of the first and second drive-force transmitting paths is being established, so that it is possible to set the lower limit value to a value appropriate for the deceleration made during the running with either one of the first and second drive-force transmitting paths being established.

In the control apparatus according to the sixth aspect of the invention, the lower limit value of the thrust applied to the primary pulley is set, such that the set lower limit value is increased with increase of the torque of the drive force source, and such that the set lower limit value is increased with increase of the torque inputted from the drive wheels. Thus, the lower limit value of the thrust applied to the primary pulley is set to a value appropriate for the deceleration made during the running with the second drive-force transmitting path being established.

In the control apparatus according to the seventh aspect of the invention, the lower limit value of the thrust applied to the primary pulley is not particularly set or is set to zero where the vehicle runs in the neutral state when being decelerated, since the second drive-force transmitting path (through which the drive force is to be transmitted by the continuously-variable transmission mechanism) is cut off and the reduction of the rotational speed of the primary pulley is not caused by reduction of the rotational speed of the drive wheels in the neutral state. Thus, the thrust applied to the primary pulley can be made appropriate for the deceleration made during the running in the neutral state.

BRIEF DESCRIPTION OF THE DRAWINGS

FIG. 5 is a flow chart illustrating a main part of a control routine executed by the control apparatus shown in FIG. 1, namely, a control routine that is executed for setting the primary-thrust lower-limit value that is appropriate for deceleration of the vehicle during the gear running mode.

DETAILED DESCRIPTION OF PREFERRED EMBODIMENT

In the embodiment of the present invention, each of the primary pulley (i.e., input-side pulley) and the secondary pulley (i.e., output-side pulley) includes, for example, a fixed sheave, a movable sheave and a hydraulic actuator, which is configured to apply a thrust for changing a width of an annular groove defined between the fixed and movable sheaves of a corresponding one of the primary and secondary pulleys. A vehicle provided with the above-described drive-force transmitting apparatus includes a hydraulic control unit configured to control pulley hydraulic pressures supplied as working hydraulic pressures to the respective hydraulic actuators, independently of each other. The hydraulic control unit may be configured to control an amount of flow of a working fluid supplied to each of the hydraulic actuators so as to consequently generate the pulley hydraulic pressures, for example. A shifting control operation is performed by the hydraulic control unit to execute a shifting action to establish a target gear ratio while preventing a belt slippage in the continuously-variable transmission mechanism, by controlling the thrust (=pulley hydraulic pressure*pressure receiving area) applied to each of the primary and secondary pulleys. The transfer element, which is looped over the primary and secondary pulleys, may be a compression-type endless annular transmission belt including at least one endless annular hoop and a multiplicity of thick-plate-shaped block elements that are held by the at least one endless annular hoop so as to be arranged in their thickness direction corresponding to a circumferential direction of the transmission belt, along the at least one endless annular hoop, or alternatively, a tension-type belt constituting an endless annular link chain including a plurality of link plates alternately superposed and mutually connected at their end portions through connecting pins. The above-described continuously variable transmission mechanism is a known belt-type continuously-variable transmission, and can be broadly interpreted to conceptually encompass not only the belt-type continuously-variable transmission but also a chain-type continuously-variable transmission.

The above-described drive force source is, for example, an internal combustion engine such as a gasoline engine and a diesel engine generating a drive force by combustion of fuel supplied thereto. The vehicle may be equipped with, in addition to or in place of a drive force source in the form of the engine, another drive force source in the form of, for example, an electric motor.

Hereinafter, a preferred embodiment of the invention will be described in detail with reference to the accompanying drawings.

EMBODIMENT

Figure 1:
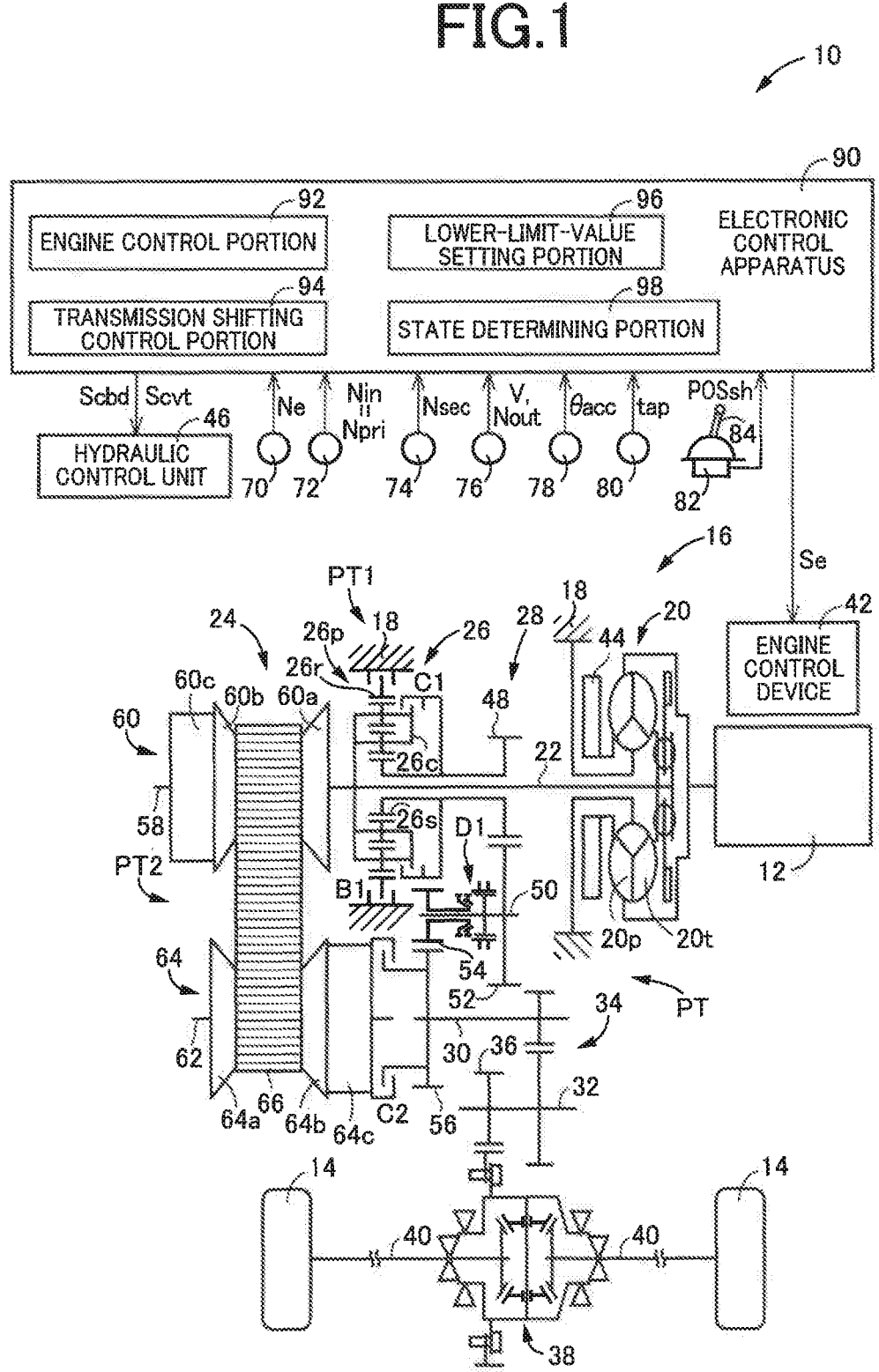
FIG. 1 is a schematic view showing a construction of a vehicle to be controlled by a control apparatus according to the present invention, and major control functions and control portions of the control apparatus.

FIG. 1 is a schematic view showing a construction of a vehicle 10 to be controlled by a control apparatus according to the present invention, and major control functions and control portions of the control apparatus. As shown in FIG. 1, the vehicle 10 is provided with an engine 12 functioning as a drive force source configured to generate a drive force, drive wheels 14 and a drive-force transmitting apparatus 16 that is provided in drive-force transmitting paths between the engine 12 and the drive wheels 14.

The drive-force transmitting apparatus 16 includes a non-rotary member in the form of a casing 18, a fluid-operated type drive-force transmitting device in the form of a known torque converter 20 that is connected to the engine 12, an input shaft 22 connected to the torque converter 20, a continuously-variable transmission mechanism 24 connected to the input shaft 22, a forward/reverse switching device 26 connected to the input shaft 22, a gear mechanism 28 which is provided in parallel with the continuously-variable transmission mechanism 24 and which is connected to the input shaft 22 via the forward/reverse switching device 26, an output shaft 30 serving as an output rotary member that is common to the continuously-variable transmission mechanism 24 and the gear mechanism 28, a counter shaft 32, a reduction gear device 34 consisting of a pair of mutually meshing gears each of which is connected to a corresponding one of the output shaft 30 and the counter shaft 32 so as to unrotatable relative to the corresponding one of the shafts 30, 32, a gear 36 connected to the counter shaft 32 so as to be unrotatable relative to the counter shaft 32, and a differential gear device 38 connected to the gear 36. The torque converter 20, input shaft 22, continuously-variable transmission mechanism 24, forward/reverse switching device 26, gear mechanism 28, output shaft 30, counter shaft 32, reduction gear device 34, gear 36 and differential gear device 38 are disposed within the casing 18. The drive-force transmitting apparatus 16 further includes right and left axles 40 that are connected to the differential gear device 38. The input shaft 22 serves as an input rotary member to which the drive force of the engine 12 is to be inputted. The output shaft 30 serves as the output rotary member through which the drive force of the engine 12 is to be outputted. It is noted that the above-described drive force is synonymous with a drive torque or a drive power unless otherwise distinguished from them.

In the drive-force transmitting apparatus 16 constructed as described above, the drive force generated by the engine 12 is transmitted to the right and left drive wheels 14, via the torque converter 20, forward/reverse switching device 26, gear mechanism 28, reduction gear device 34, differential gear device 38, axles 40 and other elements, or alternatively, via the torque converter 20, continuously-variable transmission mechanism 24, reduction gear device 34, differential gear device 38, axles 40 and other elements.

As described above, the drive-force transmitting apparatus 16 has the gear mechanism 28 and the continuously-variable transmission mechanism 24 that are provided in parallel with each other in respective drive-force transmitting paths PT between the engine 12 and the drive wheels 14. Specifically, the drive-force transmitting apparatus 16 has the gear mechanism 28 and the continuously-variable transmission mechanism 24 that are provided in parallel with each other in the respective drive-force transmitting paths PT between the input shaft 22 and the output shaft 30. That is, the drive-force transmitting apparatus 16 defines the plurality of drive-force transmitting paths that are parallel with each other between the input shaft 22 and the output shaft 30, such that the drive force of the engine 12 is to be transmitted from the input shaft 22 to the output shaft 30 through a selected one of the drive-force transmitting paths PT. The plurality of drive-force transmitting paths PT consist of a first drive-force transmitting path PT1 constituted mainly by the gear mechanism 28 and a second drive-force transmitting path PT2 constituted mainly by the continuously-variable transmission mechanism 24. The first and second drive-force transmitting paths PT1, PT2 are defined in parallel with each other between the input shaft 22 and the output shaft 30. The first drive-force transmitting path PT1 is a path through which the drive force of the engine 12 is to be transmitted from the input shaft 22 toward the drive wheels 14 through the gear mechanism 28. The second drive-force transmitting path PT2 is a path through which the drive force of the engine 12 is to be transmitted from the input shaft 22 toward the drive wheels 14 through the continuously-variable transmission mechanism 24.

In the drive-force transmitting apparatus 16, the drive force of the engine 12 is transmitted toward the drive wheels 14 through a selected one of the first and second drive-force transmitting paths PT1, PT2, which is selected depending on a running state of the vehicle 10. To this end, the drive-force transmitting apparatus 16 includes a plurality of engagement devices by which the selected one of the first and second drive-force transmitting paths PT1, PT2 is established. The plurality of engagement devices include a first clutch C1, a first brake B1 and a second clutch C2. The first clutch C1, which serves as a first engagement device, is configured to selectively connect and disconnect the first drive-force transmitting path PT1, such that the first drive-force transmitting path PT1 is established with engagement of the first clutch C1 during forward running of the vehicle 10. The first brake B1, which also serves as the first engagement device, is configured to selectively connect and disconnect the first drive-force transmitting path PT1, such that the first drive-force transmitting path PT1 is established with engagement of the first brake B1 during reverse running of the vehicle 10. That is, the first drive-force transmitting path PT1 is established with either the first clutch C1 or the first brake B1 being engaged. The second clutch C2, which serves as a second engagement device, is configured to selectively connect and disconnect the second drive-force transmitting path PT2, such that the second drive-force transmitting path PT2 is established with engagement of the second clutch C2. That is, the second drive-force transmitting path PT2 is established with the second clutch C2 being engaged. Each of the first clutch C1, first brake B1 and second clutch C2 is a known hydraulically-operated wet-type frictional engagement device that is to be frictionally engaged by operation of a hydraulic actuator. As described below, each of the first clutch C1 and the first brake B1 constitutes a part of the forward/reverse switching device 26.

The engine 12 is provided with an engine control device 42 including an electronic throttle device, a fuel injection device, an ignition device and other devices that are required for controlling an output of the engine 12. In the engine 12, the engine control device 42 is controlled, by an electronic control apparatus 90 (that corresponds to a control apparatus recited in the appended claims), based on an operation amount θacc of an accelerator pedal that corresponds to a required drive force of the vehicle 10 required by an operator of the vehicle 10, whereby an engine torque Te of the engine 12 is controlled.

The torque converter 20 is provided with a pump impeller 20p and a turbine impeller 20t that are connected to the engine 12 and the input shaft 22, respectively. The drive-force transmitting apparatus 16 is provided with a mechanical oil pump 44 connected to the pump impeller 20p. The oil pump 44 is to be driven by the engine 12, to supply a working fluid pressure as its original pressure to a hydraulic control unit (hydraulic control circuit) 46 provided in the vehicle 10, for performing a shifting control operation in the continuously-variable transmission mechanism 24, generating a belt clamping force in the continuously-variable transmission mechanism 24, and switching an operation state of each of the above-described engagement devices between its engaged state and released state.

The forward/reverse switching device 26 includes a planetary gear device 26p of double-pinion type in addition to the first clutch C1 and the first brake B1. The planetary gear device 26p is a differential mechanism including three rotary elements consisting of an input element in the form of a carrier 26c, an output element in the form of a sun gear 26s and a reaction element in the form of a ring gear 26r. The carrier 26c is connected to the input shaft 22. The ring gear 26r is operatively connected to the casing 18 through the first brake B1. The sun gear 26s is connected to a small-diameter gear 48 that is provided to be coaxial with the input shaft 22 and rotatable relative to the input shaft 22. The carrier 26c and the sun gear 26s are operatively connected to each other through the first clutch C1.

The gear mechanism 28 includes, in addition to the above-described small-diameter gear 48, a gear-mechanism counter shaft 50 and a large-diameter gear 52 which meshes with the small-diameter gear 48 and which is provided to be coaxial with the gear-mechanism counter shaft 50 and unrotatable relative to the gear-mechanism counter shaft 50. The large-diameter gear 52 has a diameter larger than that of the small-diameter gear 48. The gear mechanism 28 further includes an idler gear 54 that is provided to be coaxial with the gear-mechanism counter shaft 50 and rotatable relative to the gear-mechanism counter shaft 50, and an output gear 56 that is provided to be coaxial with the output shaft 30 and unrotatable relative to the output shaft 30. The output gear 56 has a diameter larger than that of the idler gear 54. Therefore, the gear mechanism 28 provides a gear ratio between the input shaft 22 and the output shaft 30 in the first drive-force transmitting path PT1. That is, the gear mechanism 28 corresponds to a gear mechanism configured to provide at least one gear ratio. The gear mechanism 28 further includes a dog clutch D1 as an engagement device that is disposed on the gear-mechanism counter shaft 50 between the large-diameter gear 52 and the idler gear 54 so as to selectively connect and disconnect a drive-force transmitting path between the two gears 52, 54. The dog clutch D1 is configured to selectively connect and disconnect the first drive-force transmitting path PT1, such that the first drive-force transmitting path PT1 is established with engagement of the dog clutch D1. The dog clutch D1, which is also included in the above-described plurality of engagement devices, serves as a third engagement device that cooperates with the above-described first engagement device to establish the first drive-force transmitting path PT1. That is, the first drive-force transmitting path PT1 is established with both of the dog clutch D1 and the first engagement device being engaged. An operation state of the dog clutch D1 is switched by operation of a hydraulic actuator (not shown) that is included in the drive-force transmitting apparatus 16.

The first drive-force transmitting path PT1 is established with both of the dog clutch D1 and the first engagement device being engaged, namely, with both of engagement of the dog clutch D1 and engagement of either one of the first clutch C1 and the first brake B1 which cooperate with each other to constitute the first engagement device and which are located to be closer to the input shaft 22 than the dog clutch D1. When the first clutch C1 as well as the dog clutch D1 is engaged, the first drive-force transmitting path PT1 for forward running of the vehicle 10 is established. When the first brake B1 as well as the dog clutch D1 is engaged, the first drive-force transmitting path PT1 for reverse running of the vehicle 10 is established. In the drive-force transmitting apparatus 16, with the first drive-force transmitting path PT1 being established, the drive-force transmitting apparatus 16 is placed in its drive-force transmittable state in which the drive force of the engine 12 is transmittable from the input shaft 22 to the output shaft 30 through the gear mechanism 28. With the first drive-force transmitting path PT1 being cut off by release of both of the first clutch C1 and the first brake B1 or by release of the dog clutch D1, the drive-force transmitting apparatus 16 is placed in its neutral state in which the drive force is not transmittable.

The continuously-variable transmission mechanism 24 includes a primary shaft 58 provided to be coaxial with the input shaft 22 and connected integrally to the input shaft 22, a primary pulley 60 connected to the primary shaft 58 and having a variable effective diameter, a secondary shaft 62 provided to be coaxial with the output shaft 30, a secondary pulley 64 connected to the secondary shaft 62 and having a variable effective diameter, and a transfer element in the form of a transmission belt 66 looped over or mounted on the pulleys 60, 64. The continuously-variable transmission mechanism 24 is a known belt-type continuously-variable transmission in which the drive force is transmitted owing to a friction force generated between the transmission belt 66 and each of the pulleys 60, 64, and is configured to transmit the drive force of the engine 12 toward the drive wheels 14. The friction force is synonymous with a clamping force, and is referred also to as a belt clamping force. The belt clamping force corresponds to a belt torque capacity Tcvt that is a torque capacity of the transmission belt 66 in the continuously-variable transmission mechanism 24.

The primary pulley 60 includes a fixed sheave 60a connected to the primary shaft 58, a movable sheave 60b unrotatable about an axis of the primary shaft 58 and axially movable relative to the fixed sheave 60a, and a hydraulic actuator 60c configured to apply a primary thrust Wpri to the movable sheave 60b. The primary thrust Wpri is a thrust (=primary pressure Ppri*pressure receiving area) for changing a width of a V-shaped groove defined between the fixed and movable sheaves 60a, 60b of the primary pulley 60. That is, the primary thrust Wpri is a thrust applied to the primary pulley 60 from the hydraulic actuator 60c, to clamp the transmission belt 66 that is mounted on the primary pulley 60. The primary pressure Ppri is a hydraulic pressure supplied from the hydraulic control unit 46 to the hydraulic actuator 60c, and serves as a pulley hydraulic pressure for generating the primary thrust Wpri. Meanwhile, the secondary pulley 64 includes a fixed sheave 64a connected to the secondary shaft 62, a movable sheave 64b unrotatable about an axis of the secondary shaft 62 and axially movable relative to the fixed sheave 64a, and a hydraulic actuator 64c configured to apply a secondary thrust Wsec to the movable sheave 64b. The secondary thrust Wsec is a thrust (=secondary pressure Psec*pressure receiving area) for changing a width of a V-shaped groove defined between the fixed and movable sheaves 64a, 64b of the secondary pulley 64. That is, the secondary thrust Wsec is a thrust applied to the secondary pulley 64 from the hydraulic actuator 64c, to clamp the transmission belt 66 that is mounted on the secondary pulley 64. The secondary pressure Psec is a hydraulic pressure supplied from the hydraulic control unit 46 to the hydraulic actuator 64c, and serves as a pulley hydraulic pressure for generating the secondary thrust Wsec.

In the continuously-variable transmission mechanism 24, the primary and secondary pressures Ppri, Psec are controlled by the hydraulic control unit 46 that is controlled by the electronic control apparatus 90, whereby the primary and secondary thrusts Wpri, Wsec are respectively controlled. With the primary and secondary thrusts Wpri, Wsec being controlled, the widths of the V-shaped grooves of the respective pulleys 60, 64 are controlled to be changeable whereby a belt winding diameter (effective diameter) of each of the pulleys 60, 64 is changeable and accordingly a gear ratio γcvt (=primary rotational speed Npri/secondary rotational speed Nsec) of the continuously-variable transmission mechanism 24 is changeable. Further, with the primary and secondary thrusts Wpri, Wsec being controlled, the belt clamping force is controlled such that slipping of the transmission belt 66 is not caused. That is, with the primary and secondary thrusts Wpri, Wsec being controlled, the gear ratio γcvt of the continuously-variable transmission mechanism 24 is controlled to a target gear ratio γcvtt while the transmission belt 66 is prevented from being slipped.

In the continuously-variable transmission mechanism 24, when the primary pressure Ppri is increased, the width of the V-shaped groove of the primary pulley 60 is reduced whereby the gear ratio γcvt is reduced. The reduction of the gear ratio γcvt corresponds to a shift-up action performed in the continuously-variable transmission mechanism 24. In the continuously-variable transmission mechanism 24, the lowest gear ratio γmin is provided with the width of the V-shaped groove of the primary pulley 60 being minimized. Within a range of the gear ratio γcvt that can be provided by the continuously-variable transmission mechanism 24, the lowest gear ratio gear ratio γmin is a value of the gear ratio γcvt which makes it possible to maximize the running speed of the vehicle 10. Further, in the continuously-variable transmission mechanism 24, when the primary pressure Ppri is reduced, the width of the V-shaped groove of the primary pulley 60 is increased whereby the gear ratio γcvt is increased. The increase of the gear ratio γcvt corresponds to a shift-down action performed in the continuously-variable transmission mechanism 24. In the continuously-variable transmission mechanism 24, the highest gear ratio γmax is provided with the width of the V-shaped groove of the primary pulley 60 being maximized. Within the range of the gear ratio γcvt that can be provided by the continuously-variable transmission mechanism 24, the highest gear ratio gear ratio γmax is a value of the gear ratio γcvt which makes it possible to minimize the running speed of the vehicle 10. In the continuously-variable transmission mechanism 24, the belt slippage is prevented by the primary thrust Wpri and the secondary thrust Wsec, and the target gear ratio γcvtt is established by a combination of the primary thrust Wpri and the secondary thrust Wsec, rather than by only one of the primary thrust Wpri and the secondary thrust Wsec. The gear ratio γcvt of the continuously-variable transmission mechanism 24 is dependent on a thrust ratio τ (=Wsec/Wpri) of the pulleys 60, 64. Namely, the gear ratio γcvt is changeable by change of the thrust ratio τ. For example, the gear ratio γcvt is increased with increase of the thrust ratio τ.

The output shaft 30 is provided to be coaxial with the secondary shaft 62 and rotatable relative to the secondary shaft 62. The second clutch C2 is provided in a drive-force transmitting path (that corresponds to a part of the above-described second drive-force transmitting path PT2) between the secondary pulley 64 and the output shaft 30. The second drive-force transmitting path PT2 is established with engagement of the second clutch C2. In the drive-force transmitting apparatus 16, with the second drive-force transmitting path PT2 being established, the drive-force transmitting apparatus 16 is placed in its drive-force transmittable state in which the drive force of the engine 12 is transmittable from the input shaft 22 to the output shaft 30 through the continuously-variable transmission mechanism 24. With the second drive-force transmitting path PT2 being cut off by release of the second clutch C2, the drive-force transmitting apparatus 16 is placed in its neutral state in which the drive force is not transmittable.

In the drive-force transmitting apparatus 16, a gear ratio EL of the gear mechanism 28, which is a gear ratio γgear (=input-shaft rotational speed Nin/output-shaft rotational speed Nout) provided in the first drive-force transmitting path PT1, is higher than the above-described highest gear ratio γmax of the continuously-variable transmission mechanism 24 which is the highest gear ratio provided in the second drive-force transmitting path PT2. That is, the gear ratio EL is a value that makes it possible to reduce the running speed of the vehicle 10 more than the highest gear ratio γmax. The gear ratio EL of the gear mechanism 28 corresponds to a first-speed gear ratio γ1 in the drive-force transmitting apparatus 16. The highest gear ratio γmax of the continuously-variable transmission mechanism 24 corresponds to a second-speed gear ratio γ2 in the drive-force transmitting apparatus 16.

The vehicle 10 can run in a selected one of the gear running mode and the belt running mode. The gear running mode is a running mode in which the vehicle 10 runs with the drive force being transmitted through the first drive-force transmitting path PT1 that is established in the drive-force transmitting apparatus 16. The belt running mode is a running mode in which the vehicle 10 runs with the drive force being transmitted through the second drive-force transmitting path PT2 that is established in the drive-force transmitting apparatus 16. When forward running of the vehicle 10 is to be made in the gear running mode, the first clutch C1 and the dog clutch D1 are engaged while the second clutch C2 and the first brake B1 are released. When reverse running of the vehicle 10 is to be made in the gear running mode, the first brake B1 and the dog clutch D1 are engaged while the second clutch C2 and the first clutch C1 are released. In the belt running mode, forward running of the vehicle 10 can be made.

The gear running mode is selected to be established when the vehicle 10 runs at a running speed within a relative low speed range or when the vehicle 10 is stopped. The belt running mode is selected to be established when the vehicle 10 runs at a running speed within a relatively high speed range including a middle speed range as well as a high speed range. When the belt running mode is established in the middle speed range, the dog clutch D1 is engaged. When the belt running mode is established in the high speed range, the dog clutch D1 is released, for example, for the purpose of avoiding drag of the gear mechanism 28 and other elements during running of the vehicle 10 in the belt running mode and preventing gears of the gear mechanism 28 and components (such as pinion gears) of the planetary gear device 26$p$ from being rotated at high speeds.

The vehicle 10 is provided with the electronic control apparatus 90 as a controller including the control apparatus constructed according to present invention. For example, the electronic control apparatus 90 includes a so-called microcomputer incorporating a CPU, a ROM, a RAM and an input-output interface. The CPU performs control operations of the vehicle 10, by processing various input signals, according to control programs stored in the ROM, while utilizing a temporary data storage function of the RAM. The electronic control apparatus 90 is configured to perform, for example, an engine control operation for controlling an output of the engine 12, a shifting control operation and a belt-clamping-force control operation for the continuously-variable transmission mechanism 24, and a hydraulic-pressure control operation for switching the operation state of each of the plurality of engagement devices (C1, B1, C2, D1). The electronic control apparatus 90 may be constituted by two or more control units exclusively assigned to perform different control operations such as the engine control operation and the hydraulic-pressure control operation.

The electronic control apparatus 90 receives various input signals based on values detected by respective sensors provided in the vehicle 10. Specifically, the electronic control apparatus 90 receives: an output signal of an engine speed sensor 70 indicative of an engine rotational speed Ne which is a rotational speed of the engine 12; an output signal of a primary speed sensor 72 indicative of a primary rotational speed Npri which is a rotational speed of the primary shaft 58 which is equivalent to an input-shaft rotational speed Nin; an output signal of a secondary speed sensor 74 indicative of a secondary rotational speed Nsec which is a rotational speed of the secondary shaft 62; an output signal of an output speed sensor 76 indicative of an output-shaft rotational speed Nout which is a rotational speed of the output shaft 30 and which corresponds to the running speed V of the vehicle 10; an output signal of an accelerator-operation amount sensor 78 indicative of an accelerator operation amount θacc which represents an amount of accelerating operation made by a vehicle operator; an output signal of a throttle-opening degree sensor 80 indicative of the throttle opening degree tap; and an output signal of a shift position sensor 82 indicative of an operation position POSsh of a manually-operated shifting member in the form of a shift lever 84 provided in the vehicle 10. Further, the electronic control apparatus 90 generates various output signals which are supplied to various devices such as the engine control device 42 and the hydraulic control unit 46 and which include an engine-control command signal Se for controlling the engine 12, a hydraulic control command signal Scvt for performing hydraulic controls such as controls of the shifting action and the belt clamping force of the continuously-variable transmission mechanism 24, and a hydraulic-control command signal Scbd for performing hydraulic controls such as controls of operation states of the plurality of engagement devices. It is noted that the primary rotational speed Npri is equivalent to a rotational speed of the primary pulley 60 and that the secondary rotational speed Nsec is equivalent to a rotational speed of the secondary pulley 64.

The shift lever 84 is operable to be placed in a selected one of a plurality of operation positions POSsh that consist of, for example, a parking position P, a reverse position R, a neutral position N and a drive position D. With the shift lever 84 being placed in the parking position P, the drive-force transmitting apparatus 16 is placed in its parking position in which the drive-force transmitting apparatus 16 is placed in its neutral state and rotation of the output shaft 30 is mechanically inhibited (locked). The drive-force transmitting apparatus 16 is placed in the neutral state, for example, by releasing all of the first clutch C1, first brake B1 and second clutch C2. With the shift lever 84 being placed in the reverse position R, the drive-force transmitting apparatus 16 is placed in its reverse drive position for enabling the reverse running of the vehicle 10 in the gear running mode. With the shift lever 84 being placed in the neutral position N, the drive-force transmitting apparatus 16 is placed in its neutral position in which the drive-force transmitting apparatus 16 is placed in its neutral state. With the shift lever 84 being placed in the drive position D, the drive-force transmitting apparatus 16 is placed in its forward drive position for enabling the forward running of the vehicle 10 in the gear running mode, or enabling the forward running of the vehicle 10 in the belt running mode with execution of an automatic shifting control of the continuously-variable transmission mechanism 24.

For performing various control operations in the vehicle 10, the electronic control apparatus 90 includes an engine control means or portion in the form of an engine control portion 92, a transmission shifting control means or portion in the form of a transmission shifting control portion 94, a lower-limit-value setting means or portion in the form of a lower-limit-value setting portion 96 and a state determining means or portion in the form of a state determining portion 98.

The engine control portion 92 calculates a required drive force Fdem, for example, by applying the accelerator operation amount θacc and the running velocity V to a predetermined or stored relationship (e.g., drive force map) that is obtained by experimentation or determined by an appropriate design theory. The engine control portion 92 sets a target engine torque Tet that ensures the required drive force Fdem, and outputs the engine-control command signal Se for controlling the engine 12 so as to obtain the target engine torque Tet. The outputted engine-control command signal Se is supplied to the engine control device 42.

When the operation position POSsh of the shift lever 84 is the parking position P or the neutral position N during stop of the vehicle 10, the transmission shifting control portion 94 supplies, to the hydraulic control unit 46, the hydraulic-control command signal Scbd requesting engagement of the dog clutch D1, in preparation of transition to the gear running mode. When the operation position POSsh is switched from the parking position P or the neutral position N to the drive position D during stop of the vehicle 10, the transmission shifting control portion 94 supplies, to the hydraulic control unit 46, the hydraulic-control command signal Scbd requesting engagement of the first clutch C1, whereby the gear running mode is established to enable forward running of the vehicle 10. When the operation position POSsh is switched from the parking position P or the neutral position N to the reverse position R during stop of the vehicle 10, the transmission shifting control portion 94 supplies, to the hydraulic control unit 46, the hydraulic-control command signal Scbd requesting engagement of the first brake B1, whereby the gear running mode is established to enable reverse running of the vehicle 10.

When the operation position POSsh is the drive position D, the transmission shifting control portion 94 executes a switching control operation for switching the running mode between the gear running mode and the belt running mode. Specifically, the transmission shifting control portion 94 determines whether shifting from one of first and second speed positions to the other is to be executed or not, by applying the running speed V and the accelerator operation amount θacc to a shifting map in which shift-up lines, shift-down lines and hysteresis between each of the shift-up lines and a corresponding one of the shift-down lines are defined. The first speed position corresponds to the above-described gear ratio EL provided in the gear mechanism 28 by which the drive force is to be transmitted through the first drive-force transmitting path PT1 during the gear running mode. The second speed position corresponds to the above-described highest gear ratio γmax that is the highest one of the gear ratios provided in the continuously-variable transmission mechanism 24 by which the drive force is to be transmitted through the second drive-force transmitting path PT2 during the belt running mode. Then, when determining that the shifting is to be executed, the transmission shifting control portion 94 switches the running mode from one of the gear running mode and the belt running mode to the other, so as to execute shifting up or down from one of the first and second speed positions to the other.

When determining that the running mode is to be switched from the gear running mode to the belt running mode so as to execute the shifting up from the first speed position to the second speed position, the transmission shifting control portion 94 supplies, to the hydraulic control unit 46, the hydraulic-control command signal Scbd requesting releasing and engaging actions of the respective first and second clutches C1, C2, so as to perform a so-called "clutch to clutch" shifting operation. Thus, as a result of the shifting up from the first speed position to the second speed position, the second drive-force transmitting path PT2 is established in place of the first drive-force transmitting path PT1 in the drive-force transmitting apparatus 16. When determining that the running mode is to be switched from the belt running mode to the gear running mode so as to execute the shifting down from the second speed position to the first speed position, the transmission shifting control portion 94 supplies, to the hydraulic control unit 46, the hydraulic-control command signal Scbd requesting releasing and engaging actions of the respective second and first clutches C2, C1, so as to perform the clutch to clutch shifting operation. Thus, as a result of the shifting down from the second speed position to the first speed position, the first drive-force transmitting path PT1 is established in place of the second drive-force transmitting path PT2 in the drive-force transmitting apparatus 16. In the switching control operation for switching the running mode between the gear running mode and the belt running mode, the switching between the first and second drive-force transmitting paths PT1, PT2 is made by only the above-described clutch to clutch shifting operation for making a torque transfer via an transition state in which the dog clutch D1 is engaged in the belt running mode in the middle speed range, so that the switching control operation is performed with a shifting shock being restrained.

For executing a shifting action in the continuously-variable transmission mechanism 24 during the belt running mode, the transmission shifting control portion 94 supplies, to the hydraulic control unit 46, the hydraulic-control command signal Scvt for controlling the primary pressure Ppri and the secondary pressure Psec such that the target gear ratio γcvtt is provided in the continuously-variable transmission mechanism 24 while the belt slippage is not caused in the continuously-variable transmission mechanism 24.

Specifically, the transmission shifting control portion 94 calculates a target primary rotational speed Nprit, by applying the accelerator operation amount θacc and the running speed V to a predetermined relationship such as a CVT shifting map. The transmission shifting control portion 94 calculates a target gear ratio γcvtt (=Nprit/Nsec), based on the target primary rotational speed Nprit. The transmission shifting control portion 94 calculates an estimated value of the engine torque Te, by applying the throttle opening degree tap and the engine rotational speed Ne to a predetermined relationship such as an engine torque map. The transmission shifting control portion 94 calculates a turbine torque Tt, based on the estimated value of the engine torque Te and a predetermined relationship such as characteristic of the torque converter 20. The transmission shifting control portion 94 uses the turbine torque Tt as a primary input torque Tpri that is an input torque inputted to the primary pulley 60. The primary input torque Tpri is a torque that is to act on the primary shaft 58. The transmission shifting control portion 94 calculates a thrust ratio τ for establishing a target gear ratio γcvtt, by applying the target gear ratio γcvtt and a torque ratio to a predetermined relationship such as a thrust ratio map, wherein the torque ratio is a ratio (=Tpri/Tprilim) of the calculated primary input torque Tpri to a predetermined limit torque Tprilim that can be inputted to the primary pulley 60. The transmission shifting control portion 94 calculates a target primary thrust Wprit and a target secondary thrust Wsect that cooperate with each other to establish the thrust ratio τ. In this instance, if one of the target primary thrust Wprit and the target secondary thrust Wsect is determined, the other can be determined based on the thrust ratio τ that establishes the target gear ratio γcvtt. The transmission shifting control portion 94 converts the target primary thrust Wprit and the target secondary thrust Wsect into a target primary pressure Pprit (=Wprit/pressure receiving area) and a target secondary pressure Psect (=Wsect/pressure receiving area), respectively. The transmission shifting control portion 94 supplies, to the hydraulic control unit 46, the hydraulic-control command signal Scvt by which the primary pressure Ppri and the secondary pressure Psec is controlled to the target primary pressure Pprit and the target secondary pressure Psect, respectively. The hydraulic control unit 46 regulates the primary pressure Ppri and the secondary pressure Psec, by operating solenoid valves in accordance with the hydraulic-control command signal Scvt. In the above description relating to the shifting control of the continuously-variable transmission mechanism 24, the thrusts, which are required for enabling the gear ratio γcvt to be held at the target gear ratio γcvtt, have been discussed for the convenience of description. In process of a shifting action executed in the continuously-variable transmission mechanism 24, actually, thrusts required for executing a desired shift-up action or shift-down action are added to the thrusts required for enabling the gear ratio γcvt to be held at the target gear ratio γcvtt.

Each of the target primary thrust Wprit and the target secondary thrust Wsect is calculated by taking account of a required thrust that is minimally required for preventing the belt slippage in the continuously-variable transmission mechanism 24. The required thrust is a limit thrust that corresponds to a thrust shortly before occurrence of the belt slippage in the continuously-variable transmission mechanism 24.

The transmission shifting control portion 94 sets a primary limit thrust Wprilim that is the limit thrust for the primary pulley 60 and a secondary limit thrust Wseclim that is the limit thrust for the secondary pulley 64, by using equations (1) and (2) given below. In the equations (1) and (2), "α" represents a sheave angle of the pulleys 60, 64, "μ" represents a coefficient of friction generating between the sheave and the element of the belt, "Rpri" represents ½ of the belt winding diameter (effective diameter) of the primary pulley 60, which is calculated based on the gear ratio γcvt of the continuously-variable transmission mechanism 24, "γcvt*Tpri" represents a torque inputted to the secondary pulley 64, and "Rsec" represents ½ of the belt winding diameter (effective diameter) of the secondary pulley 64, which is calculated based on the gear ratio γcvt of the continuously-variable transmission mechanism 24. It is noted that the sheave angle α is an angle defined between a conical surface of each of the pulleys 60, 64 and a plane perpendicular to an axis of the each of the pulleys 60, 64.

$$W\text{prilim} = (Tpri * \cos \alpha)/(2 * \mu * R\text{pri}) \quad (1)$$

$$W\text{seclim} = (\gamma cvt * Tpri * \cos \alpha)/(2 * \mu * R\text{sec}) \quad (2)$$

The transmission shifting control portion 94 calculates a secondary shifting-control thrust Wsecsh (=τ*Wprilim) as a thrust that is required to be applied to the secondary pulley 64 for the shift control, based on the primary limit thrust Wprilim and the thrust ratio τ that is required to establish the target gear ratio γcvtt. The transmission shifting control portion 94 sets, as a target secondary thrust Wsect, a larger one of the secondary limit thrust Wseclim and the secondary shifting-control thrust Wsecsh. The transmission shifting control portion 94 calculates the target primary thrust Wprit (=Wsect/τ), based on the target secondary thrust Wsect and the thrust ratio τ that is required to establish the target gear ratio γcvtt.

Upon deceleration of the vehicle 10, the lower-limit-value setting portion 96 sets a primary-thrust lower-limit value Wprimin (=F(Tpri)) that is the lower limit value of the primary thrust Wpri, based on the primary input torque Tpri, such that the primary thrust Wpri is not smaller than the required thrust. The right side of the above equation (1) is used for the function "F(Tpri)". In the following description, "deceleration of the vehicle 10" will be simply referred to as "vehicle deceleration". It is noted that the primary input torque Tpri upon vehicle deceleration is a value different from the turbine torque Tt that is used in the above equation (1), as described below.

Upon vehicle deceleration, if the primary-thrust lower-limit value Wprimin is larger than the primary limit thrust Wprilim, the transmission shifting control portion 94 uses the primary-thrust lower-limit value Wprimin as the primary limit thrust Wprilim. Or alternatively, upon vehicle deceleration, if the primary-thrust lower-limit value Wprimin is larger than the target primary thrust Wprit (calculated as described above), the transmission shifting control portion 94 sets the target primary thrust Wprit to the primary-thrust lower-limit value Wprimin.

Figure 2:
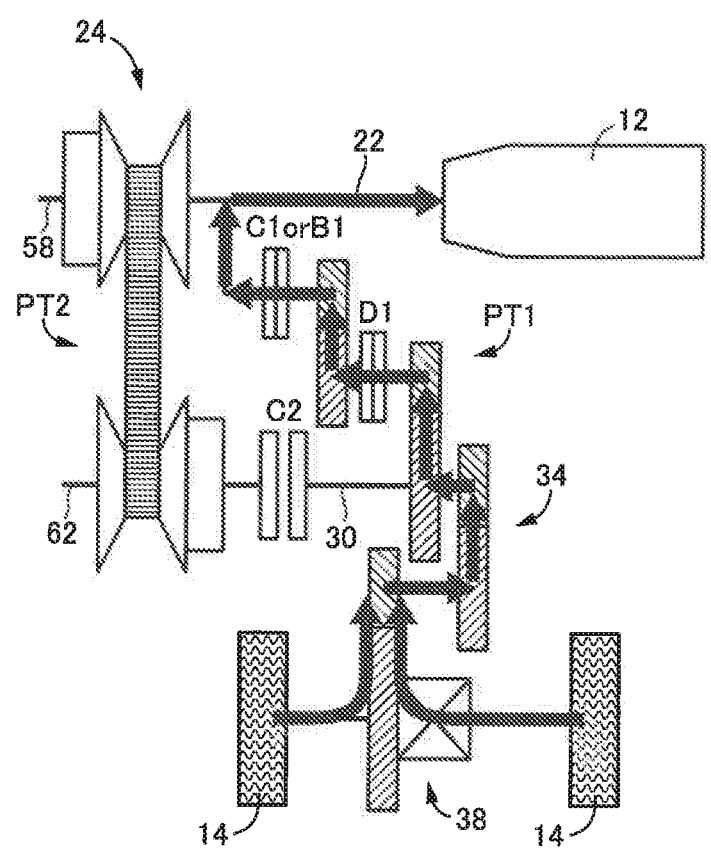
FIG. 2 is a view for explaining an idea for setting a primary-thrust lower-limit value (i.e., a lower limit value of a thrust applied to a primary pulley) upon deceleration of the vehicle during a gear running mode.
Figure 3:
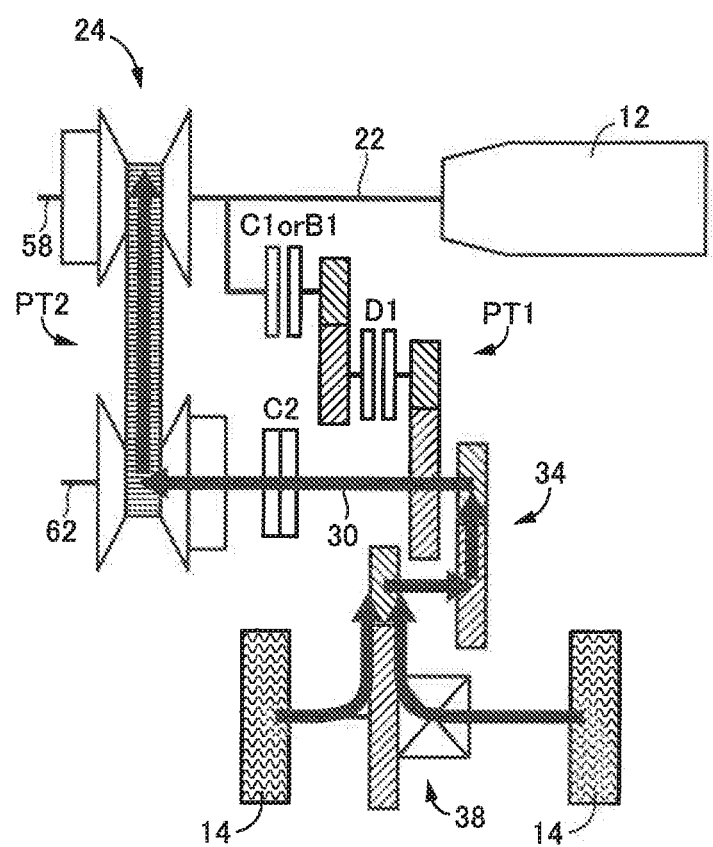
FIG. 3 is a view for explaining an idea for setting the primary-thrust lower-limit value upon deceleration of the vehicle during a belt running mode.
Figure 4:
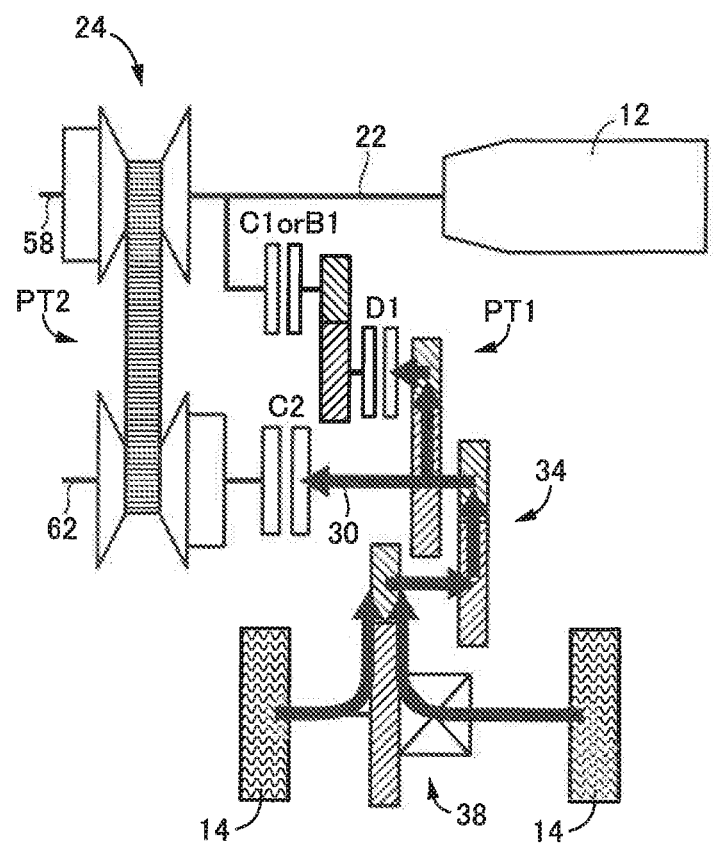
FIG. 4 is a view for explaining an idea for setting the primary-thrust lower-limit value upon deceleration of the vehicle during a neutral state.

Upon vehicle deceleration, an inertia torque is generated by reduction of the rotational speed of the drive wheels 14. The inertial torque accompanying the reduction of the rotational speed of the drive wheels 14 is referred to as "drive-wheel-side inertia torque". Thus, there is a case when, as the primary input torque Tpri, the drive-wheel-side inertia torque, in addition to the turbine torque Tt, has to be taken into consideration. As running states upon vehicle deceleration, there are three states, i.e., a running state in the gear running mode, a running state in the belt running mode and a running state in which the drive-force transmitting apparatus 16 is placed in the neutral state. These three running states are different in terms of state of transmission of the drive force in the drive-force transmitting apparatus 16, so that they could be different also in terms of state of the primary input torque Tpri. There will be described an idea for setting the primary-thrust lower-limit value Wprimin upon vehicle deceleration in the three states, with reference to FIGS. 2-4. In FIGS. 2-4, thick arrows indicate transmission of the drive-wheel-side inertia torque.

FIG. 2 is a view for explaining an idea for setting the primary-thrust lower-limit value Wprimin upon vehicle deceleration during the gear running mode. As shown in FIG. 2, the second clutch C2 is released during the gear running mode, so that the drive-wheel-side inertia torque is received by the torque capacity of an engaged one of the first clutch C1 and the first brake B1 and/or the torque capacity of the torque capacity of the dog clutch D1. Further, although the turbine torque Tt and the drive-wheel-side inertia torque are transmitted to the primary shaft 58, the continuously-variable transmission mechanism 24 is not required to receive these torques since the second clutch C2 is released. Therefore, upon vehicle deceleration during the gear running mode, the turbine torque Tt and the drive-wheel-side inertia torque do not have to be considered as the primary input torque Tpri.

Meanwhile, upon vehicle deceleration during the gear running mode, the primary rotational speed Npri is reduced with reduction of the rotational speed of the drive wheels 14. Thus, upon vehicle deceleration during the gear running mode, the belt slippage does not occur in the continuously-variable transmission mechanism 24, as long as the belt torque capacity Tcvt is large enough to receive an inertia of the continuously-variable transmission mechanism 24 by itself, which is generated due to reduction of the primary rotational speed Npri.

Specifically, in a state when the second clutch C2 is released, the continuously-variable transmission mechanism 24 can be regarded as a rigid body that is connected to the primary shaft 58. Thus, the primary-thrust lower-limit value Wprimin may be set to a thrust value that makes it possible to receive the inertia torque in the continuously-variable transmission mechanism 24, which is generated by reduction of the primary rotational speed Npri. The inertia torque, which is generated in the continuously-variable transmission mechanism 24 as a result of reduction of the primary rotational speed Npri, is referred to as "CVT inertia torque". Upon vehicle deceleration during the gear running mode, the CVT inertia torque converted on the primary shaft 58 is used as the primary input torque Tpri. The CVT inertia torque, which is converted on the primary shaft 58, is referred to as "primary-shaft CVT inertia torque".

The primary-shaft CVT inertia torque is increased with increase of amount of change of the primary rotational speed Npri. The amount of change of the primary rotational speed Npri corresponds to a rate of change of the primary rotational speed Npri in a control operation that is repeatedly executed.

As a result of reduction of the primary rotational speed Npri, the secondary rotational speed Nsec is also reduced. The CVT inertia torque contains an inertia torque of the secondary pulley 64 that accompanies the reduction of the secondary rotational speed Nsec. An equivalent inertia of the secondary pulley 64, which is converted on the primary shaft 58, is increased with reduction of the gear ratio γcvt of the continuously-variable transmission mechanism 24. The inertia torque of the secondary pulley 64, which is converted on the primary shaft 58, is increased with reduction of the gear ratio γcvt. Therefore, the primary-shaft CVT inertia torque is increased with reduction of the gear ratio γcvt.

The primary-shaft CVT inertia torque, which is used as the primary input torque Tpri, is dependent on the amount of change of the primary rotational speed Npri and the gear ratio γcvt of the continuously-variable transmission mechanism 24. In a case where the vehicle 10 runs in the gear running mode when being decelerated, the lower-limit-value setting portion 96 sets the primary-thrust lower-limit value Wprimin, based on the amount of change of the primary rotational speed Npri and the gear ratio γcvt of the continuously-variable transmission mechanism 24.

The primary-thrust lower-limit value Wprimin is increased with increase of the primary input torque Tpri (see the right side of the above equation (1)). That is, the primary-thrust lower-limit value Wprimin is increased with increase of the primary-shaft CVT inertia torque. Therefore, the lower-limit-value setting portion 96 makes the primary-thrust lower-limit value Wprimin larger as the gear ratio γcvt of the continuously-variable transmission mechanism 24 is smaller, and makes the primary-thrust lower-limit value Wprimin larger as the amount of change of the primary rotational speed Npri is larger.

The lower-limit-value setting portion 96 calculates the primary-shaft CVT inertia torque as the primary input torque Tpri, by applying the gear ratio γcvt of the continuously-variable transmission mechanism 24 and the amount of change of the primary rotational speed Npri to a predetermined relationship in the form of a primary-shaft CVT inertia torque map. The lower-limit-value setting portion 96 makes the primary-thrust lower-limit value Wprimin larger as the primary input torque Tpri is larger. The primary-shaft CVT inertia torque map is "map (gear ratio γcvt of the continuously-variable transmission mechanism 24, amount of change of the primary rotational speed Npri)".

The above-described primary-shaft CVT inertia torque map represents a relationship in which the primary-shaft CVT inertia torque as the primary input torque Tpri is increased with reduction of the gear ratio γcvt of the continuously-variable transmission mechanism 24, and is increased with increase of the amount of change of the primary rotational speed Npri.

FIG. 3 is a view for explaining an idea for setting the primary-thrust lower-limit value Wprimin upon vehicle deceleration during the belt running mode. As shown in FIG. 3, the second clutch C2 is engaged while the first clutch C1 and the first brake B1 are released during the belt running mode, so that the drive-wheel-side inertia torque has to be received by the continuously-variable transmission mechanism 24. Therefore, upon vehicle deceleration during the belt running mode, the turbine torque Tt and the drive-wheel-side inertia torque have to be considered as the primary input torque Tpri.

The primary-thrust lower-limit value Wprimin may be set to a thrust value that makes it possible to receive the turbine torque Tt and the drive-wheel-side inertia torque. Therefore, upon vehicle deceleration during the belt running mode, a combined torque is used as the primary input torque Tpri, wherein the combined torque is a sum of the turbine torque Tt (that is the torque of the engine 12) and the drive-wheel-side inertia torque acting on the primary shaft 58. The drive-wheel-side inertia torque, which acts on the primary shaft 58, is a torque applied from the drive wheels 14, and is referred to as "primary-shaft drive-wheel-side inertia torque".

In a case where the vehicle 10 runs in the belt running mode when being decelerated, the lower-limit-value setting portion 96 sets the primary-thrust lower-limit value Wprimin, based on the turbine torque Tt and the primary-shaft drive-wheel-side inertia torque.

The primary-thrust lower-limit value Wprimin is increased with increase of the primary input torque Tpri (see the right side of the above equation (1)). Therefore, the lower-limit-value setting portion 96 makes the primary-thrust lower-limit value Wprimin larger as the turbine torque Tt is larger, and makes the primary-thrust lower-limit value Wprimin larger as the primary-shaft drive-wheel-side inertia torque is larger.

The lower-limit-value setting portion 96 calculates the primary-shaft drive-wheel-side inertia torque as the primary input torque Tpri, by applying the amount of change of the output shaft rotational speed Nout to a predetermined relationship in the form of a primary-shaft drive-wheel-side inertia torque map. The amount of change of the output shaft rotational speed Nout corresponds to a rate of change of the output shaft rotational speed Nout in a control operation that is repeatedly executed. It is noted that, upon vehicle deceleration, the primary rotational speed Npri as well as the output shaft rotational speed Nout is reduced. Therefore, the primary-shaft drive-wheel-side inertia torque map may be a relationship in which the primary-shaft drive-wheel-side inertia torque is increased with increase of the amount of change of the primary rotational speed Npri. In this case, the lower-limit-value setting portion 96 calculates the primary-shaft drive-wheel-side inertia torque, by applying the amount of change of the primary rotational speed Npri to the primary-shaft drive-wheel-side inertia torque map.

FIG. 4 is a view for explaining an idea for setting the primary-thrust lower-limit value Wprimin upon vehicle deceleration during the neutral state of the drive-force transmitting apparatus 16. The vehicle deceleration during the neutral state of the drive-force transmitting apparatus 16 corresponds to an inertia running made with the drive-force transmitting apparatus 16 being placed in the neutral state. As shown in FIG. 4, the first clutch C1, first brake B1 and second clutch C2 are released during the neutral state, so that the reduction of the primary rotational speed Npri is not caused by the reduction of the rotational speed of the drive wheels 14. Further, the drive-wheel-side inertia torque is not transmitted to the continuously-variable transmission mechanism 24. Further, although the turbine torque Tt is transmitted to the primary shaft 58, the continuously-variable transmission mechanism 24 is not required to receive the transmitted turbine torque Tt since the second clutch C2 is released. Therefore, upon vehicle deceleration during the neutral state, the turbine torque Tt, the drive-wheel-side inertia torque and the CVT inertia torque do not have to be considered as the primary input torque Tpri. It is noted that, although the dog clutch D1 is also released in FIG. 4, the dog clutch D1 does not have to be necessarily released upon vehicle deceleration during the neutral state of the drive-force transmitting apparatus 16.

In a case where the vehicle 10 runs during the neutral state of the drive-force transmitting apparatus 16 when being decelerated, the lower-limit-value setting portion 96 does not set the primary-thrust lower-limit value Wprimin, or sets the primary-thrust lower-limit value Wprimin to zero. From another point of view, upon vehicle deceleration during the neutral state of the drive-force transmitting apparatus 16, it is also possible to set the primary input torque Tpri to zero.

The state determining portion 98 determines whether the vehicle 10 is in its decelerated state, namely, whether the vehicle 10 is being decelerated or not. The vehicle deceleration is, for example, a deceleration that is made by operation of wheel brakes of the vehicle 10, a deceleration that is made when the vehicle 10 is to be stopped, or a rapid deceleration in which a rate of deceleration is higher than a certain value. This certain value of deceleration is a predetermined value of vehicle deceleration that requires, for example, the drive-wheel-side inertia torque, or the reduction of the primary rotational speed Npri caused by reduction of the rotational speed of the drive wheels 14 to be taken into account in setting of the primary thrust Wpri.

When determining that the vehicle 10 is being decelerated, the state determining portion 98 determines whether the drive-force transmitting apparatus 16 is in the neutral state or not. This determination as to whether the drive-force transmitting apparatus 16 is in the neutral state or not is made irrespective of which one of the gear running mode and the belt running mode is being established as the running mode. When determining that the drive-force transmitting apparatus 16 is not in the neutral state, the state determining portion 98 determines which one of the gear running mode and the belt running mode is being established as the running mode. In this instance, for example, the state determining portion 98 may determine whether the vehicle 10 is running in the gear running mode or not, or may determine whether the vehicle 10 is running in the belt running mode or not.

FIG. 5 is a flow chart illustrating a main part of a control routine executed by the electronic control apparatus 90, namely, a control routine that is executed for setting the primary-thrust lower-limit value Wprimin that is appropriate for vehicle deceleration during the gear running mode. This control routine is executed repeatedly, for example, during running of the vehicle 10.

As shown in FIG. 5, the control routine is initiated with step S10 corresponding to function of the state determining portion 98. In this step S10, it is determined whether the vehicle 10 is being decelerated or not. When a negative determination is made at step S10, one cycle of execution of the control routine is completed. When an affirmative determination is made at step S10, step S20 corresponding to function of the state determining portion 98 is implemented to determine whether the drive-force transmitting apparatus 16 is in the neutral state or not. When a negative determination is made at step S20, step S30 corresponding to function of the state determining portion 98 is implemented to determine which one of the gear running mode and the belt running mode is being established as the running mode. For example, at this step S30, it is determined whether the gear running mode is being established or not. When an affirmative determination is made at step S30, step S40 corresponding to function of the lower-limit-value setting portion 96 is implemented to set the primary-thrust lower-limit value Wprimin, based on the gear ratio γcvt of the continuously-variable transmission mechanism 24 and the amount of change of the primary rotational speed Npri. On the other hand, when a negative determination is made at step S30, the control flow goes to step S50 corresponding to function of the lower-limit-value setting portion 96. In this step S50, the primary-thrust lower-limit value Wprimin is set based on the combined torque of the turbine torque Tt and the primary-shaft drive-wheel-side inertia torque. Further, when an affirmative determination is made at step S20, the control flow goes to step S60 corresponding to function of the lower-limit-value setting portion 96. In this step S60, the primary-thrust lower-limit value Wprimin is set to zero. Each of the above-described steps S40, S50 and S60 is followed by step S70 corresponding to function of the transmission shifting control portion 94. In this step S70, the primary-thrust lower-limit value Wprimin, which has been set in the corresponding one of the steps S40, S50 and S60, is reflected in the target primary thrust Wprit.

As described above, in the present embodiment, where the vehicle 10 runs in the gear running mode when being decelerated, the primary-thrust lower-limit value Wprimin is set based on the gear ratio γcvt of the continuously-variable transmission mechanism 24 and the amount of change of the primary rotational speed Npri, which influence the magnitude of the torque generated in the continuously-variable transmission mechanism 24, since the second drive-force transmitting path PT2 (through which the drive force is to be transmitted by the continuously-variable transmission mechanism 24) is cut off by release of the second clutch C2. Thus, it is possible to set the primary-thrust lower-limit value Wprimin to a value appropriate for the deceleration made during the running in the gear running mode.

In the present embodiment, where the vehicle 10 runs in the gear running mode when being decelerated, the primary-thrust lower-limit value Wprimin is set to be larger as the gear ratio γcvt of the continuously-variable transmission mechanism 24 is smaller, namely, as the gear ratio γcvt is a higher speed gear ratio, and is set to be larger as the amount of change of the primary rotational speed Npri is larger. Thus, the primary-thrust lower-limit value Wprimin is set to a value appropriate for the deceleration made during the running in the gear running mode.

In the present embodiment, the primary input torque Tpri is calculated by applying the gear ratio γcvt of the continuously-variable transmission mechanism 24 and the amount of change of the primary rotational speed Npri to the primary-shaft CVT inertia torque map, and the primary-thrust lower-limit value Wprimin is set to be larger as the primary input torque Tpri is larger. Thus, the primary-thrust lower-limit value Wprimin is set to a value appropriate for the deceleration made during the running in the gear running mode.

In the present embodiment, the primary-shaft CVT inertia torque map represents a relationship in which the primary input torque Tpri is increased with reduction of the gear ratio γcvt of the continuously-variable transmission mechanism 24 and a relationship in which the primary input torque Tpri is increased with increase of the amount of change of the primary rotational speed Npri. Thus, the primary-thrust lower-limit value Wprimin is set to a value appropriate for the deceleration made during the running in the gear running mode.

In the present embodiment, where the vehicle 10 runs in the belt running mode when being decelerated, the primary-thrust lower-limit value Wprimin is set based on the turbine torque Tt and the primary-shaft drive-wheel-side inertia torque, which influence the magnitude of the torque applied to the continuously-variable transmission mechanism 24 when the second drive-force transmitting path PT2 is established. Thus, the primary-thrust lower-limit value Wprimin is set to a value appropriate for the deceleration made during the running in the belt running mode. That is, the primary-thrust lower-limit value Wprimin is determined in a manner varies depending on which one of the first and second drive-force transmitting paths PT1, PT2 is being established, so that it is possible to set the primary-thrust lower-limit value Wprimin to a value appropriate for the deceleration made during the running with either one of the first and second drive-force transmitting paths PT1, PT2 being established.

In the present embodiment, where the vehicle 10 runs in the belt running mode when being decelerated, the primary-thrust lower-limit value Wprimin is set to be larger as the turbine torque Tt is larger, and is set to be larger as the primary-shaft drive-wheel-side inertia torque is larger. Thus, it is possible to set the primary-thrust lower-limit value Wprimin to a value appropriate for the deceleration made during the running in the belt running mode.

In the present embodiment, where the vehicle 10 runs in the neutral state, the primary-thrust lower-limit value Wprimin is not set or is set to zero, since the second drive-force transmitting path PT2 (through which the drive force is to be transmitted by the continuously-variable transmission mechanism 24) is cut off and the reduction of the rotational speed of the primary pulley 60 is not caused by reduction of the rotational speed of the drive wheels 14 in the neutral state. Thus, the primary thrust Wpri can be made appropriate for the deceleration made during the running in the neutral state of the transmitting apparatus 16.

While the preferred embodiment of this invention has been described in detail by reference to the drawings, it is to be understood that the invention may be otherwise embodied.

For example, in the above-described embodiment, upon vehicle deceleration, the transmission shifting control portion 94 may supply, to the hydraulic control unit 46, the hydraulic-control command signal Scvt requesting reduction of the primary thrust Wpri that causes the gear ratio γcvt of the continuously-variable transmission mechanism 24 to be increased. Particularly, when the vehicle 10 is decelerated to be stopped, the transmission shifting control portion 94 may supply, to the hydraulic control unit 46, the hydraulic-control command signal Scvt requesting the primary thrust Wpri to be reduced to cause the gear ratio γcvt of the continuously-variable transmission mechanism 24 to be increased to the highest gear ratio γmax. Thus, upon vehicle deceleration, it is possible to get ready for, for example, restart or reacceleration. The present invention is useful in such an arrangement in which, upon vehicle deceleration, the primary thrust Wpri is reduced to increase the gear ratio γcvt of the continuously-variable transmission mechanism 24.

In the above-described embodiment, the second clutch C2 is disposed in a drive-force transmitting path between the secondary pulley 64 and the output shaft 30. However, this arrangement is not essential. It is possible to employ a modified arrangement in which, for example, the second clutch C2 is disposed in a drive-force transmitting path between the primary pulley 60 and the input shaft 22. In this modified arrangement, the secondary shaft 62 is connected integrally with the output shaft 30, and the primary shaft 58 is connected to the input shaft 22 through the second clutch C2.

In the above-described modified arrangement in which the second clutch C2 is disposed between the primary pulley 60 and the input shaft 22, upon vehicle deceleration in the gear running mode, the continuously-variable transmission mechanism 24 is not required to receive the drive-wheel-side inertia torque, because the second clutch C2 is released although the drive-wheel-side inertia torque is transmitted to the continuously-variable transmission mechanism 24. Further, upon vehicle deceleration in the gear running mode, the primary rotational speed Npri is reduced with reduction of the rotational speed of the drive wheels 14. Therefore, as in the above-described embodiment, upon vehicle deceleration in the gear running mode, the primary-thrust lower-limit value Wprimin may be set to a thrust value that makes it possible to receive the inertia torque in the continuously-variable transmission mechanism 24, which is generated by reduction of the primary rotational speed Npri. Upon vehicle deceleration in the belt running mode, the primary-thrust lower-limit value Wprimin may be set to a thrust value that makes it possible to receive the turbine torque Tt and the drive-wheel-side inertia torque, as in the above-described embodiment.

In the above-described modified arrangement in which the second clutch C2 is disposed between the primary pulley 60 and the input shaft 22, upon vehicle deceleration in the neutral state, the primary-thrust lower-limit value Wprimin may be set to a thrust value that makes it possible to receive the inertia torque in the continuously-variable transmission mechanism 24, as in case of vehicle deceleration in the gear running mode. This setting is the same as in case of vehicle deceleration in the neutral state in a vehicle drive-force transmitting apparatus which defines a single drive-force transmitting path through which the drive force is to be transmitted by the continuously-variable transmission mechanism and which includes the forward/reverse switching device disposed between the continuously-variable transmission mechanism and the drive force source. On the other hand, in the arrangement in which the second clutch C2 is disposed between the secondary pulley 64 and the output shaft 30, as in the above-described embodiment, upon vehicle deceleration in the neutral state of the drive-force transmitting apparatus 16, the primary-thrust lower-limit value Wprimin is not set or set to zero.

In the above-described embodiment, the gear mechanism 28 is a gear mechanism which provides a single gear ratio that is higher than the highest gear ratio γmax of the continuously-variable transmission mechanism 24. However, the gear mechanism 28 may be, for example, a gear mechanism which provides a plurality of different gear ratios. That is, the gear mechanism 28 may be a gear mechanism in which a shifting action is to be executed from one of two or more gear positions to the other. Alternatively, the gear mechanism 28 may be a gear mechanism that provides a gear ratio that is lower than the lowest gear ratio γmin of the continuously-variable transmission mechanism 24. Or alternatively, the gear mechanism 28 may be a gear mechanism that provides a gear ratio that is lower than the lowest gear ratio γmin of the continuously-variable transmission mechanism 24 and another gear ratio that is higher than the highest gear ratio γmax of the continuously-variable transmission mechanism 24.

In the above-described embodiment, the running mode of the drive-force transmitting apparatus 16 is switched between the gear running mode and the belt running mode, by using the shifting map in which the shift-up lines and shift-down lines are defined. However, the running mode of the drive-force transmitting apparatus 16 may be switched by setting a gear ratio satisfying the required drive force Fdem that is calculated based on the running speed V and the accelerator operation amount θacc.

In the above-described embodiment, the torque converter 20 is used as fluid-operated drive-force transmitting device. However, in place of the torque converter 20, any one of other types of fluid-operated drive-force transmitting devices such as a fluid coupling, which do not have a torque boosting function, may be used, for example. Further, the fluid-operated drive-force transmitting device does not have to be necessarily provided. In the above-described embodiment, the dog clutch D1 is provided in the first drive-force transmitting path PT1 through which the drive force is to be transmitted by the gear mechanism 28. However, the provision of the dog clutch D1 is not essential for carrying out the invention.

It is to be understood that the embodiment described above is given for illustrative purpose only, and that the present invention may be embodied with various modifications and improvements which may occur to those skilled in the art.

NOMENCLATURE OF ELEMENTS

10: vehicle
12: engine (drive force source)
14: drive wheels
16: vehicle drive-force transmitting apparatus
22: input shaft (input rotary member)
24: continuously-variable transmission mechanism
28: gear mechanism
30: output shaft (output rotary member)
60: primary pulley
64: secondary pulley
66: transmission belt (transfer element)
90: electronic control apparatus (control apparatus)
94: transmission shifting control portion
96: lower-limit-value setting portion
B1: first brake (first engagement device)
C1: first clutch (first engagement device)
C2: second clutch (second engagement device)
PT1: first drive-force transmitting path
PT2: second drive-force transmitting path

What is claimed is:

1. A control apparatus for a drive-force transmitting apparatus that is to be provided in a vehicle having a drive force source and drive wheels,
wherein the drive-force transmitting apparatus includes:
an input rotary member to which a drive force is to be transmitted from the drive force source;
an output rotary member from which the drive force is to be outputted to the drive wheels;
a gear mechanism configured to provide at least one gear ratio;
a continuously-variable transmission mechanism including a primary pulley, a secondary pulley, a transfer element that is looped over the primary and secondary pulleys, and a hydraulic actuator configured to apply, to the primary pulley, a thrust, based on which the transfer element is to be clamped by the primary pulley; and
first and second engagement devices,
wherein the drive-force transmitting apparatus defines a plurality of drive-force transmitting paths that are provided in parallel with each other between the input rotary member and the output rotary member such that the drive force is to be transmitted from the input rotary member to the output rotary member through the drive-force transmitting paths,
wherein the plurality of drive-force transmitting paths includes a first drive-force transmitting path that is to be established by engagement of the first engagement device, such that the drive force is to be transmitted by the gear mechanism through the first drive-force transmitting path when the first drive-force transmitting path is established by the engagement of the first engagement device,
wherein the plurality of drive-force transmitting paths includes a second drive-force transmitting path that is to be established by engagement of the second engagement device, such that the drive force is to be transmitted by the continuously-variable transmission mechanism through the second drive-force transmitting path when the second drive-force transmitting path is established by the engagement of the second engagement device, and
wherein said control apparatus comprises:
a lower-limit-value setting portion configured, when the vehicle is decelerated with the first drive-force transmitting path being established, to set a lower limit value of the thrust that is to be applied to the primary pulley from the hydraulic actuator such that the lower limit value is set based on a gear ratio of the continuously-variable transmission mechanism and an amount of change of a rotational speed of the primary pulley.

2. The control apparatus according to claim 1, wherein said lower-limit-value setting portion is configured, when the vehicle is decelerated with the first drive-force transmitting path being established, to set the lower limit value of the thrust that is to be applied to the primary pulley, such that the set lower limit value is increased with reduction of the gear ratio of the continuously-variable transmission mechanism, and such that the set lower limit value is increased with increase of the amount of change of the rotational speed of the primary pulley.

3. The control apparatus according to claim 1, wherein said lower-limit-value setting portion, when the vehicle is decelerated with the first drive-force transmitting path being established, to set the lower limit value of the thrust that is to be applied to the primary pulley, such that the set lower limit value is increased with increase of an input torque inputted to the primary pulley, the input torque being calculated by applying the gear ratio of the continuously-variable transmission mechanism and the amount of change of the rotational speed of the primary pulley to a predetermined relationship.

4. The control apparatus according to claim 3, wherein said predetermined relationship is a relationship in which the input torque is increased with reduction of the gear ratio of the continuously-variable transmission mechanism, and is a relationship in which the input torque is increased with increase of the amount of change of the rotational speed of the primary pulley.

5. The control apparatus according to claim 1, wherein said lower-limit-value setting portion is configured, when the vehicle is decelerated with the second drive-force transmitting path being established, to set the lower limit value of the thrust that is to be applied to the primary pulley such that the lower limit value is set based on a torque of the drive force source and a torque applied from the drive wheels.

6. The control apparatus according to claim 5, wherein said lower-limit-value setting portion is configured, when the vehicle is decelerated with the second drive-force transmitting path being established, to set the lower limit value of the thrust that is to be applied to the primary pulley, such that the set lower limit value is increased with increase of the torque of the drive force source, and such that the set lower limit value is increased with increase of the torque applied from the drive wheels.

7. The control apparatus according to claim 1,
wherein the second engagement device is disposed between the secondary pulley and the output rotary member, and
wherein said lower-limit-value setting portion is configured, when the vehicle is decelerated in a neutral state in which both of the first and second engagement devices are released, to not set the lower limit value of the thrust or set the lower limit value to zero.

8. The control apparatus according to claim 1, further comprising a state determining portion,
wherein said state determining portion is configured to determine whether the vehicle is decelerated or not,
wherein said state determining portion is configured to determine whether the drive-force transmitting apparatus is in a neutral state or not, and
wherein said state determining portion is configured, when determining that the drive-force transmitting apparatus is not in the neutral state, to determine which one of the first and second drive-force transmitting paths is established in the drive-force transmitting apparatus.

\* \* \* \* \*